(12) United States Patent
Soles et al.

(10) Patent No.: US 8,018,929 B2
(45) Date of Patent: Sep. 13, 2011

(54) EXPANDED TRANSMISSION CONTROL PROTOCOL, METHODS OF OPERATION AND APPARATUS

(75) Inventors: Roger L. Soles, San Francisco, CA (US); Dan Teodosiu, Palo Alto, CA (US); Joseph C. Pistritto, Belmont, CA (US); Xavier Boyen, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 925 days.

(21) Appl. No.: 11/137,896

(22) Filed: May 25, 2005

(65) Prior Publication Data
US 2006/0031527 A1 Feb. 9, 2006

Related U.S. Application Data

(62) Division of application No. 09/948,476, filed on Sep. 6, 2001, now Pat. No. 7,143,131.

(60) Provisional application No. 60/288,764, filed on May 4, 2001.

(51) Int. Cl.
*H04L 12/28* (2006.01)
*G06F 15/16* (2006.01)

(52) U.S. Cl. .................................. 370/389; 709/227

(58) Field of Classification Search .................. 370/389
See application file for complete search history.

(56) References Cited

U.S. PATENT DOCUMENTS

| | | |
|---|---|---|
| 5,724,510 A | 3/1998 | Arndt et al. |
| 5,867,663 A * | 2/1999 | McClure et al. ............. 709/234 |
| 5,903,724 A | 5/1999 | Takamoto et al. |
| 5,922,049 A | 7/1999 | Radia et al. |
| 6,178,455 B1 | 1/2001 | Schutte et al. |
| 6,295,298 B1 | 9/2001 | Hrastar et al. |
| 6,308,238 B1 * | 10/2001 | Smith et al. ................. 710/310 |
| 6,415,331 B1 | 7/2002 | Ariga |
| 6,473,793 B1 | 10/2002 | Dillon et al. |
| 6,477,569 B1 * | 11/2002 | Sayan et al. ................. 709/223 |
| 6,571,296 B1 | 5/2003 | Dillon |
| 6,640,325 B1 | 10/2003 | Fischer |
| 6,829,670 B1 | 12/2004 | Nakamura |

(Continued)

FOREIGN PATENT DOCUMENTS

EP 0330834 9/1986

(Continued)

OTHER PUBLICATIONS

Walton, Sean, "Writing a C-based Client/Server", 2003.*

(Continued)

*Primary Examiner* — Daniel J Ryman
*Assistant Examiner* — John Blanton

(57) ABSTRACT

A communication protocol service in support of TCP based communication is modified to improve the operational efficiency of a server for a particular type of client-server application. The service is modified to support connection pools and connection groups within the connection pools, to enable connections with clients to be grouped and share a common file descriptor. The service is provided with an API to allow an application server to create the connection pools, connection groups and connections. The API also include receive and send services adapted to support the connection pool and connection group architecture, and to allow explicit acknowledgement of received transmissions under control of the application server. Further, in various embodiments, the buffering architecture of the service, as well as acknowledgement of request packets by the service are also modified.

17 Claims, 13 Drawing Sheets

U.S. PATENT DOCUMENTS

| | | | |
|---|---|---|---|
| 6,868,079 B1 | 3/2005 | Hunt | |
| 6,965,571 B2 | 11/2005 | Webber | |
| 7,006,512 B2* | 2/2006 | Yang et al. | 370/413 |
| 2003/0105865 A1* | 6/2003 | McCanne et al. | 709/225 |

FOREIGN PATENT DOCUMENTS

| | | |
|---|---|---|
| WO | WO99/04536 | 1/1999 |

OTHER PUBLICATIONS

Postel, J.; "RFC 768 User Datagram Protocol"; Aug. 28, 1980.
Postel, J.; Editor; "RFC 791 Internet Protocol"; Sep. 1981.
Postel, J.; Editor, "RFC 792 Internet Control Message Protocol"; Sep. 1981.
Postel, J.; Editor, "RFC 793 Transmission Control Message Protocol"; Sep. 1981.
Mockapetris, P.; "RFC 1034 Domain Names—Concepts and Facilities"; Nov. 1987.
Mockapetris, P.; "RFC 1035 Domain Names—Implementations and Specification"; Nov. 1987.
Jacobson, V. et al.; "RFC 1072 TCP/IP Extensions for Long-Delay Paths"; Oct. 1988.
Jacobson, V., et al.; "RFC 1323 TCP Extensions for High Performance"; May 1992.
Braden, R.T.; "RFC 1379 Extending TCP for Transactions—Concepts"; Nov 1992.
Bellovin, S.; "RFC 1948 Defending Against Sequence Number Attacks"; May 1996.
Deering, S. et al. "RFC 2460 Internet Protocol, Version 6 (IPv6) Specification"; Dec. 1998.
Day, M., et al.; "RFC 2778 A Model for Presence and Instant Messaging"; Feb. 2000.
Day, M. et al.; "Instant Messaging/Presence Protocol Requirements"; Feb. 2000.
International Search Report for PCT/US01/45804 dated Jan. 30, 2003.

* cited by examiner

| | | |
|---|---|---|
| 402 | Connection Pool Initialization & Finalization | extern int xtcp_initialize (size_t buffer_pool_size) ~402a<br>extern int xtcp_finalize (void) ~402b |
| 404 | Connection Group Creation & Deletion | extern int xtcp_open_group<br>(int domain, int type, int protocol, u_int16_t port) ~404a<br>extern int xtcp_close_group (int gd) ~404b |
| 406 | Connection Acceptance, Get Parameters & Closing | extern int xtcp_accept (int gd) ~406a<br>extern int xtcp_pars (int gd, int cd, struct sockaddr_in* sa) ~406b<br>extern int xtcp_close (int gd, int cd) ~406c |
| 408 | Receive & Send Packets on Open Connections | extern int xtcp_recv (int gd, int* cd, void* buf, size_t len) ~408a<br>extern int xtcp_send (int gd, int cd, size_t ACKd, void* buf, size_t len) ~408b |
| 410 | Connection Group Operations | typedef struct xtcp_set xtcp_set ~410a<br>void XTCP_ZERO (xtcp_set* set) ~410b<br>void XTCP_CLR (int gd, xtcp_set* set) ~410c<br>void XTCP_SET (int gd, xtcp_set* set) ~410d<br>void XTCP_ISSET (int gd, xtcp_set* set) ~410e<br>extern int xtcp_select (int n, xtcp_set* readgds, xtcp_set* acceptgds, struct timeval* timeout) ~410f |

Fig 4

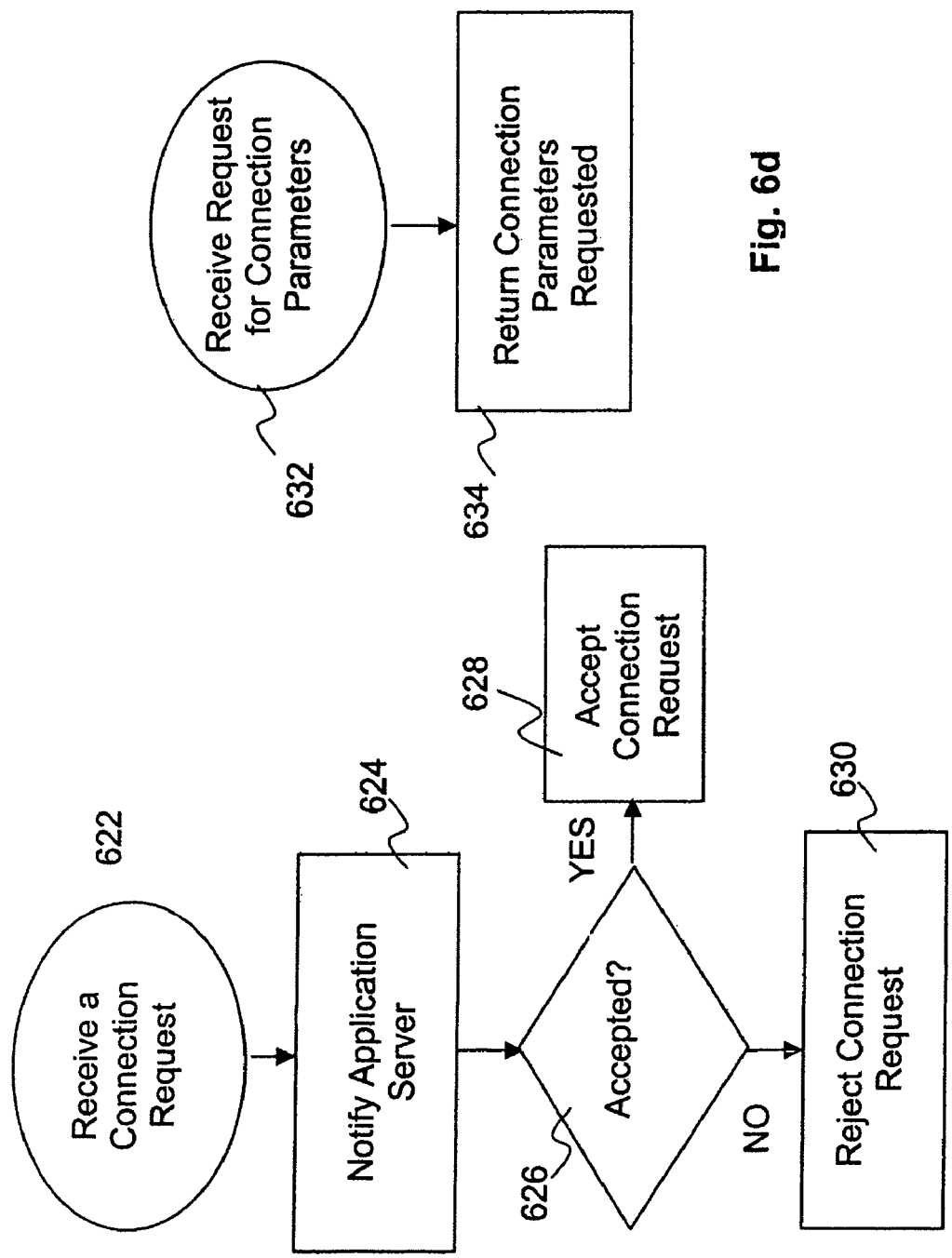

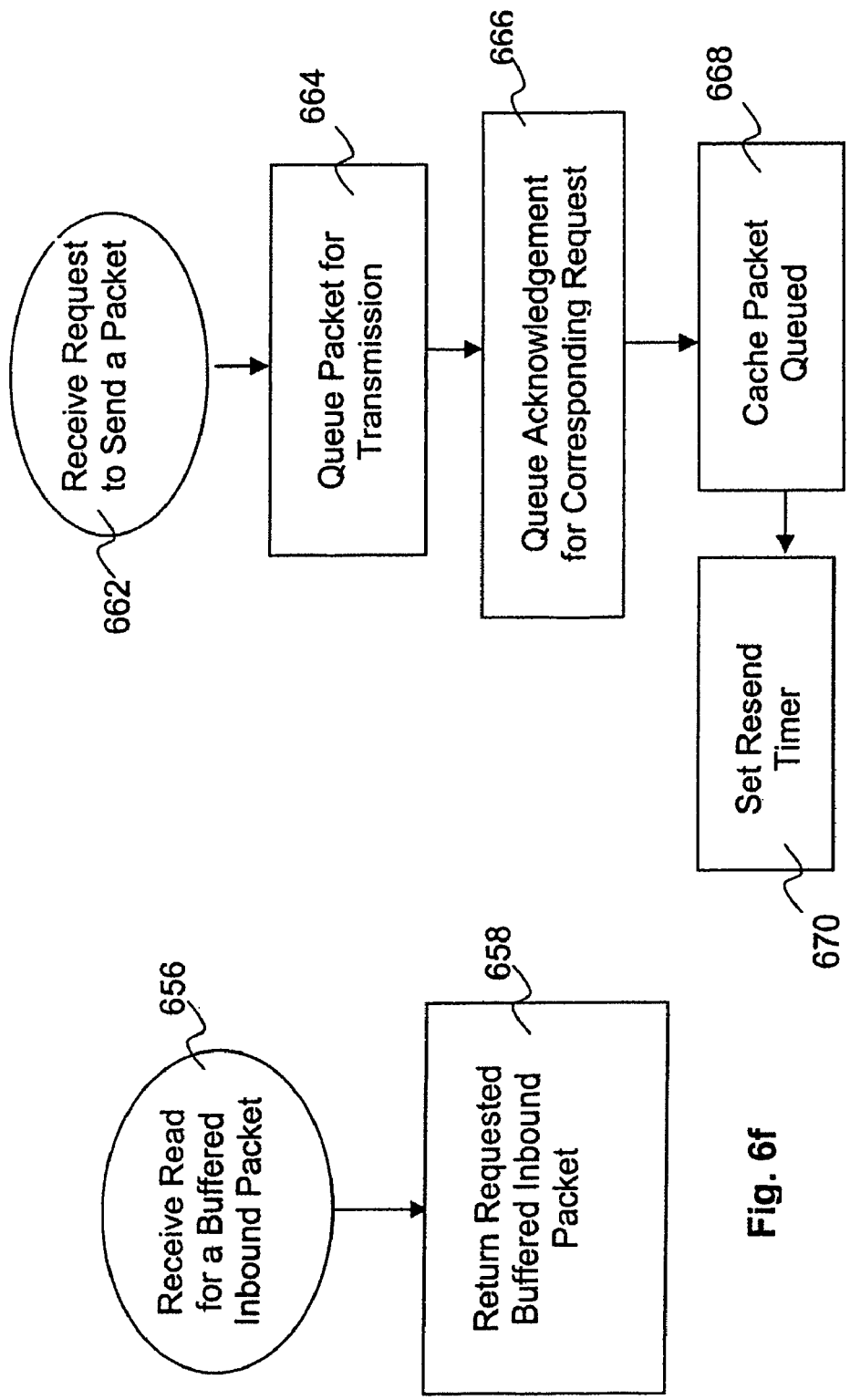

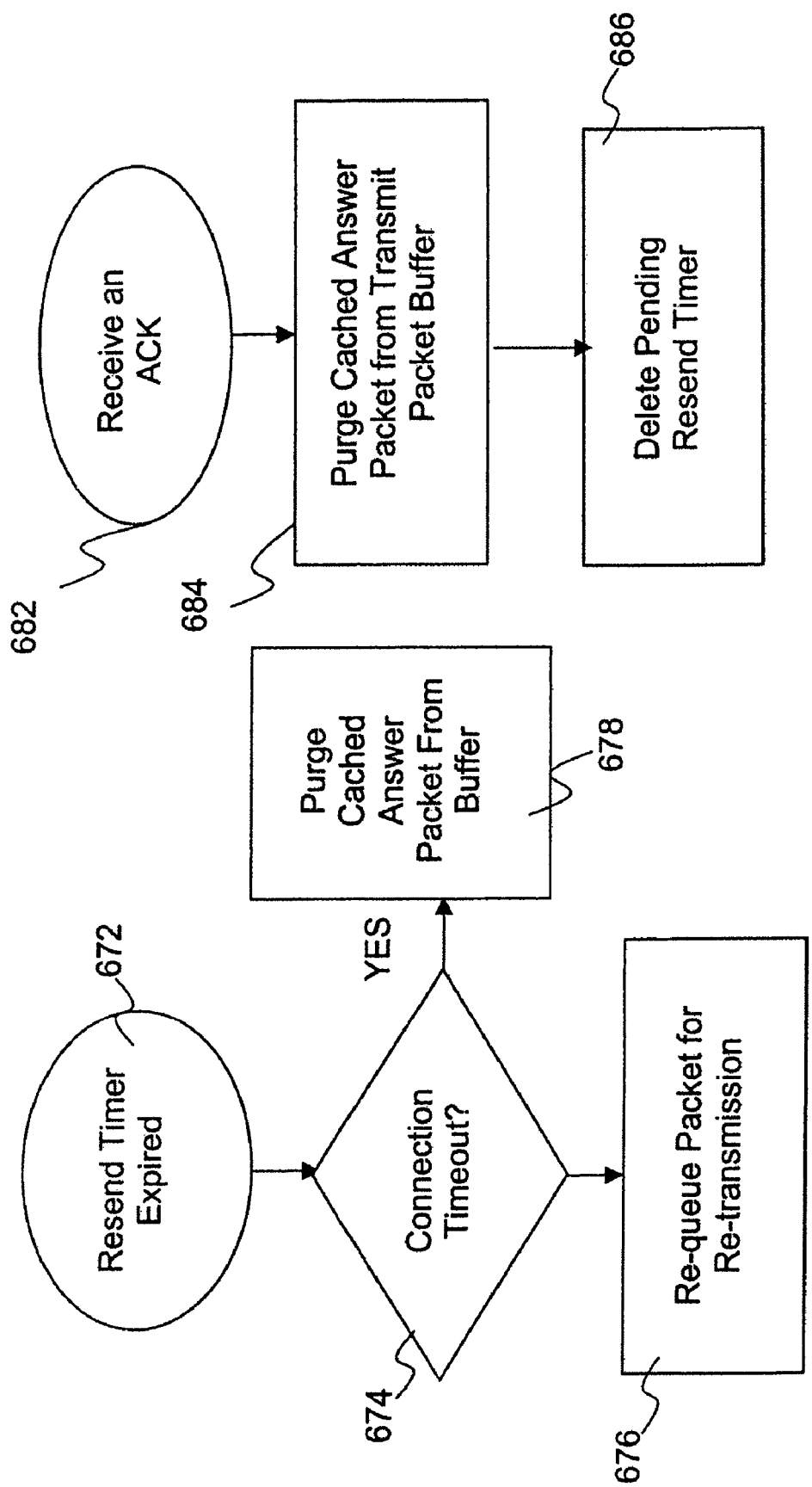

EXPANDED TRANSMISSION CONTROL PROTOCOL, METHODS OF OPERATION AND APPARATUS

RELATED APPLICATION

This is a divisional of U.S. patent application Ser. No. 09/948,476, entitiled "Expanded Transmission Control Protocol, Methods of Operation and Apparatuses", filed Sep. 6, 2001, which claims priority to U.S. Provisional Application No. 60/288,764, entitled "expanded Transmission Control Protocol (XTCP)", filed on May 4, 2001, each of which is hereby incorporated herein by reference.

BACKGROUND OF THE INVENTION

1. Field of the Invention

The present invention relates to the field of networking. More specifically, the present invention relates to the TCP/IP (Transmission Control Protocol/Internet Protocol) protocol suite, including systems equipped to support inter-system communications in accordance with TCP/IP and the methods practiced thereon.

2. Background Information

Maintaining a very large number of open, persistent, client connections is a problem that is shared by many Web applications or services. For instance, in the case of both the MSN and AOL Instant Messenger applications, up to a few tens of million open connections from clients need to be maintained during peak hours. These approaches have in common the fact that clients connect to the servers via long-lived TCP connections, but communicate only infrequently with the servers; the general aspects of Messaging and Presence protocols are discussed in [RFC2778] and [RFC2779].

In some applications, UDP (the User Datagram Protocol) [RFC768] can be used to resolve the issues relating to the overhead of TCP connections for large numbers of clients. For example, the BIND protocol [RFC1034] [RFC1035] used for DNS (the Domain Name System) had to be designed to avoid using TCP connections in the normal case, in order to provide scalability to very large numbers of clients; BIND first attempts to use UDP and only falls back on TCP in the case of repeated communication failures. Unfortunately, many firewalls restrict UDP access, and router designs often include rules to preference TCP packets, thus discarding UDP packets when congestion increases. Therefore UDP cannot be considered a general replacement for TCP even when sequencing and guaranteed delivery are implemented at the application layer.

Further, maintaining a large number of open incoming TCP connections is difficult with most current operating systems, including all flavors of UNIX and Windows. This is due to the following limitations of the current TCP protocol stack implementations:

- Limitations of the BSD socket interface (as well as TLI—Transport Layer Interface) to address large numbers of connections efficiently. In particular, most current operating systems limit the number of open file descriptors per process. Since every incoming active connection requires one open file descriptor, this usually limits the number of open connections per process to only a few thousand. Other limitations in the operating system include dispatching among "ready" connections that have data available; in UNIX, the cost of the select (2) system call is linear in the number of selected file descriptors.

- Large memory footprint for storing context and data transmission buffers per connection. Each connection may use up to 8 K bytes of buffer space for the assembly of input packets and for retransmits. For one million connections, this corresponds to 8 G bytes of operating system buffers, a size that exceeds the available physical memory on all but the largest servers.

A variant of TCP, called T/TCP (for Transaction-oriented TCP) [RFC1379], attempts to combine some of the advantages of TCP (such as detection of duplicates and handling of retransmissions) with a lower overhead. T/TCP is designed for transactions, in which a client request is followed by a server response. The main feature of T/TCP compared with TCP is to provide a mechanism for faster reopening of a connection between two machines that have previously communicated. However, this mechanism does not fully eliminate the overhead of having to reopen the connection for every transaction. There is also an additional caching requirement, due to the fact that data is transmitted before both parties agree that a connection has been re-established.

If it were not for the above limitations, in many cases a single server could potentially handle a very large number of clients, if one assumes that communication between server and clients is only infrequent (such is the case for instant messenger applications, for instance). For instance, with one million client connections and assuming communication with clients occurs on the average every 30 s, a single server would only need to process about 33,000 packets per second, something well within the range of a high-end machine.

Thus, an extended TCP, together with associated methods of operation, that can enhance the operating efficiency of servers, in particular, enabling these servers to concurrently support open, persistent connections with a very large number of clients (as many as a million plus) is desired; especially if the desired results may be achieved by requiring little or no modification to the client machines and applications.

REFERENCES

[RFC768] J. Postel, ISI: RFC 768 User Datagram Protocol. August 1980.

[RFC791] J. Postel, Editor; ISI: RFC 791 Internet Protocol. September 1981.

[RFC792] J. Postel, Editor, ISI: RFC 792 Internet Control Message Protocol. September 1981.

[RFC793] J. Postel, Editor, ISI: RFC 793 Transmission Control Message Protocol. September 1981.

[RFC1034] P. Mockapetris, ISI: RFC 1034 Domain Names—Concepts and Facilities. November 1987.

[RFC1035] P. Mockapetris, ISI: RFC 1034 Domain Names—Implementations and Specification. November 1987.

[RFC1072] V. Jacobson, LBL; R. Braden, ISI: RFC 1072 TCP/IP Extensions for Long-Delay Paths. October 1988.

[RFC1323] V. Jacobson, LBL; R. Braden, ISI; D. Borman, Cray Research: RFC 1323 TCP Extensions for High Performance. May 1992.

[RFC1379] R. T. Braden, ISI: RFC 1379 Extending TCP for Transactions—Concepts. November 1992.

[RFC1948] S. Bellovin, AT&T Research: RFC 1948 Defending Against Sequence Number Attacks. May 1996.

[RFC2460] S. Deering, R. Hinden: RFC 2460 Internet Protocol, Version 6 (IPv6) Specification. December 1998.

[RFC2778] M. Day et al.: A Model for Presence and Instant Messaging. February 2000.

[RFC2779] M. Day et al: Instant Messaging/Presence Protocol Requirements. February 2000.

SUMMARY OF THE INVENTION

A communication protocol service in support of TCP/IP based communication is modified to improve the operational efficiency of a server for a particular type of client-server application.

In accordance with a first aspect of the present invention, the service is modified to support connection pools, and connection groups within the connection pools, to enable connections with clients to be grouped and share a common file descriptor, to reduce the number of file descriptors required to concurrently support a given amount of clients. The service is provided with an API to allow an application server to request the creation and destruction of the connection pools, the connection groups, and connections. The API also includes receive and send services adapted to support the connection pool and connection group architecture.

In accordance with a second aspect of the present invention, the buffering architecture of the service is also modified. Receive packets of connections of common connection group membership are buffered in a shared manner, whereas all transmit packets are buffered in a shared manner, independent of their connection group memberships.

In accordance with a third aspect of the present invention, the service is modified to defer acknowledgement of a request packet, until the answer packet is transmitted by the application server, to reduce the amount of packet traffic, to further enable the concurrent support of a large number of clients.

In various embodiments, one or more of these aspects are practiced.

BRIEF DESCRIPTION OF DRAWINGS

The present invention will be described by way of exemplary embodiments, but not limitations, illustrated in the accompanying drawings in which like references denote similar elements, and in which:

FIG. 4 illustrates the Application Programming Interface (API) of XTCP, in accordance with one embodiment;

FIGS. 6a-6i illustrate the operational flow of the relevant aspects of the various functions in support of the XTCP API of the present invention, in accordance with one embodiment.

DETAILED DESCRIPTION OF THE INVENTION

As summarized earlier, the present invention includes an enhanced TCP protocol implementation, and related methods and apparatuses for client-server applications that involve a large number of open, persistent client connections. In the description to follow, various aspects of the present invention will be described. However, the present invention may be practiced with only some or all aspects of the present invention. For purposes of explanation, specific numbers, materials and configurations are set forth in order to provide a thorough understanding of the present invention. However, the present invention may be practiced without some of the specific details. In other instances, well known features are omitted or simplified in order not to obscure the present invention.

Parts of the description will be presented in terms of operations performed by a processor based device, using terms such as data, tables, requesting, determining, acknowledging and the like, consistent with the manner commonly employed by those skilled in the art to convey the substance of their work to others skilled in the art. As well understood by those skilled in the art, the quantities take the form of electrical, magnetic, or optical signals capable of being stored, transferred, combined, and otherwise manipulated through mechanical, electrical and/or optical components of the processor based device. The term "processor" includes microprocessors, micro-controllers, digital signal processors, and the like, that are standalone, adjunct or embedded.

Various operations will be described as multiple discrete steps in turn, in a manner that is most helpful in understanding the present invention. However, the order of description should not be construed as to imply that these operations are necessarily order dependent. In particular, these operations need not be performed in the order of presentation. Further, the description repeatedly uses the phrase "in one embodiment", which ordinarily does not refer to the same embodiment, although it may.

Overview

Figure 1:
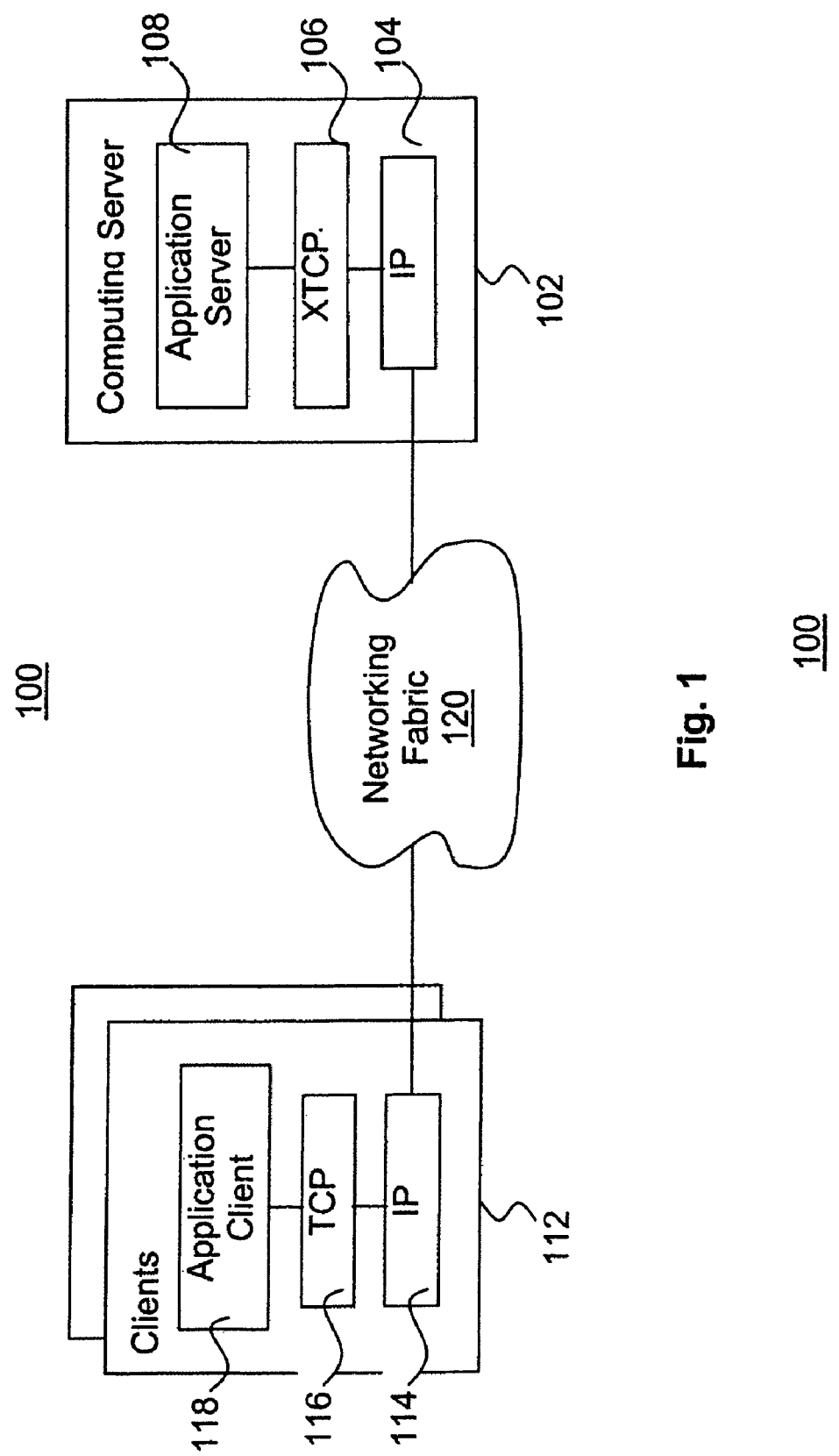
FIG. 1 illustrates an overview of the present invention, in accordance with one embodiment.

Referring now first to FIG. 1, wherein a block diagram illustrating an overview of the present invention, in accordance with one embodiment, is shown. As illustrated, client computing devices 112 are communicatively coupled to computing server 102, via networking fabric 120. Executing on computing server 102 is application server 108 equipped to provide application services to clients, and executing on client computing devices 112 are application clients 118 of application server 108 facilitating users of client computing devices 112 in accessing the application services of application server 108. Also, executing on computing server 102 and client computing devices 112 are communication services 114 and 116 on client computing devices 112, and 104 and 106 on computing server 102, respectively. For the embodiment, these communication services are as follows: services 114 and 104 are (possibly different) implementations of the Internet Protocol (IP) network layer found in the operating systems of the client computing devices 112 and the computing server 102, respectively; service 116 is an implementation of the Transmission Control Protocol (TCP) transport layer found in the operating system of the client computing devices 112; and XTCP transport layer service 106 is an embodiment of the present invention.

As will be described in more detail below, XTCP communication service 106 is incorporated with the teachings of the present invention, to operate more efficiently, thereby enabling a significantly larger number of application clients 118 to be communicatively coupled to and serviced by application server 108 at the same time, and the enhancements that improve the operating efficiency of server 102 are substantially transparent to client computing devices 112 (including application client 118, TCP service 116, and IP service 114).

More specifically, the TCP portion of the TCP/IP communication stack of computing server 102 is enhanced or extended (where hereinafter this enhancement or extension will be called XTCP) to support connection pools, connection groups within the connection pools, and connections having connection group memberships. Further, for the illustrated embodiment, XTCP communication service 106 employs a modified receive and transmit packet buffering architecture, as well as a modified acknowledgement practice. XTCP communication service 106 includes an API having various connection pool, connection group and connection creation/deletion functions, as well as receive, send, and select functions that support the concept of connection pool and connection group.

Except for the teachings of the present invention incorporated with XTCP service 106, and application server 108 accessing the TCP services through the API (Application Programming Interface) of XTCP, computing server 102, including application server 108 and IP communication services 104, otherwise represent a broad range of these elements known in the art. For example, computing server 102 may be any one of a number of computer servers available from IBM of Armonk, N.Y. or Sun Microsystems of Menlo Park, Calif. Application server 108 may e.g. be an instant messaging server or other applications, and communication services 104 may be IP services incorporated within e.g. the UNIX or the Windows operating systems.

Similarly, client computing devices 112 may be any ones of a number of notebook or desktop computers available from e.g. Dell Computer of Austin, Tex., or Apple Computer of Cupertino, Calif. Application client 118 may be e.g. an instant messaging client, and TCP and IP communication services 116 and 114, respectively, may be TCP/IP services incorporated within e.g. the Windows operating system, available from Microsoft, Inc., of Redmond, Wash. Alternatively, client computing devices 112 may also be palm-sized computing devices, personal digital assistants, set-top boxes, wireless mobile phones, and so forth.

Connection Pools, Connection Groups and Connections

Figure 2:
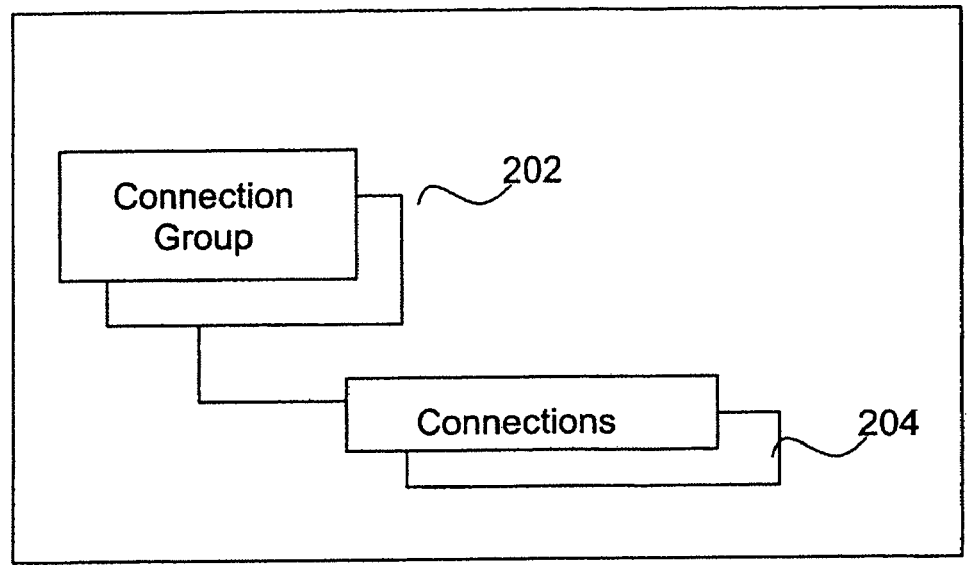
FIG. 2 illustrates the logical relationship between a connection pool, connection groups and connections, in accordance with one embodiment.

FIG. 2 illustrates the logical relationships between connection pools, connection groups and connections, in accordance with one embodiment. As illustrated, under the present invention, an application, such as application server 108, may request XTCP services 106 to create one or more connection pools 200, and within each of these connection pools, connection groups 202. Thereafter, an application, such as application server 108, may request XTCP services 106 to create or accept connections 204 attached to connection groups 202 to facilitate communications with corresponding application clients 118. For the embodiment, each connection pool 200 may comprise one or more connection groups 202, and each connection group 202 may in turn comprise one or more connections 204. Each connection 204 facilitates communication between application server 108 and one corresponding application client 118.

Figure 3:
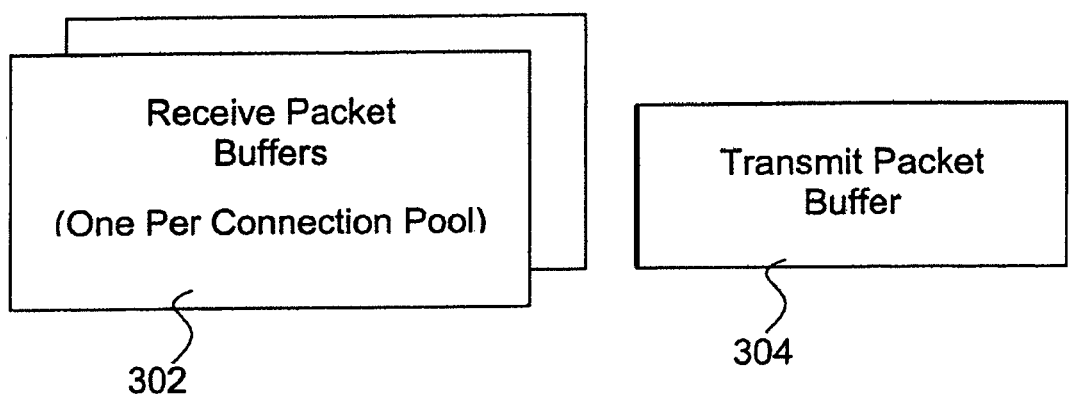
FIG. 3 illustrates the buffer architecture for receive and transmit packets, in accordance with one embodiment.

In a presently preferred embodiment, received packets of all connections 204 of a connection pool 200 are buffered together in a shared received packet buffer for that connection pool (302 of FIG. 3). Transmit packets, on the other hand, are buffered together in a shared transmit packet buffer (304 of FIG. 3), independent of connection group or connection pool membership. Further, in the presently preferred embodiment, connections 204 having common group membership share a common IP port on computing server 102. In other embodiments, connections 204 of different connection groups 202, i.e. different connection groups 202, may also share a common port. Connections 204 having common group membership also share a common operating system file or socket descriptor, wherein common connection management information, such as preferences, priorities, and notifications of incoming messages, that can be managed at the group level for all connections of the group are stored.

Thus, under the present invention, the number of operating system and application file or socket descriptors required on computing server 102 to support N concurrently open persistent TCP connections to application clients 118 is significantly reduced, thereby enabling a significantly larger number of concurrently open persistent TCP connections to be supported. Further, the buffering architecture is streamlined. Additionally, as will be described in more detail below, the protocol, in particular, the acknowledgement aspect, is also streamlined.

Analysis has shown that under the present invention, over a million of concurrently open persistent TCP connections may be supported on computing server 102 using only a few hundred megabytes of main memory, at a sustained rate of 30,000 messages per second, whereby for illustrative purposes each message is assumed to consist of a request of size 1 KB sent by application client 118 and a reply of size 1 KB sent by application server 108, a significant improvement over the prior art.

Application Programming Interface (API)

FIG. 4 illustrates an API provided by XTCP service 106 of FIG. 1 to facilitate application server 108 of FIG. I in utilizing the expanded services of XTCP service 106, in accordance with one embodiment.

As illustrated, API 400 includes a number of function calls, xtcp_initialize and xtcp_finalize 402a and 402b for requesting XTCP service 106 to create and initialize, and to tear down a connection pool 200, respectively. For the illustrated embodiment, xtcp_initalize 402a includes in particular, a parameter "buffer_pool_size" for specifying the size of the earlier described shared receive packet buffer 302 to be created for the connection pool 200. xtcp_initialize returns a negative error status, or zero if a connection was successfully created, respectively.

API 400 further includes a number of function calls, xtcp_open_group and xtcp_close_group 404a and 404b for requesting XTCP service 106 to create and initialize, and to close down a connection group 202, respectively. For the illustrated embodiment, xtcp_open_group 404a includes in particular, a parameter "domain" for specifying the communication domain, or the protocol family (in one embodiment, the possible values for this parameter are the constants PF_UNIX, PF_INET, or PF_INET6, which those skilled in the art will recognize as a subset of the domain values accepted by the Berkeley Socket API); a parameter "type" for specifying the communication semantics (in one embodiment, the value of this parameter is set to the constant SOCK_STREAM defined in the Berkeley Socket API); a parameter "protocol" for specifying the protocol to be used with the socket (in one embodiment, the value of this parameter is set to 0); and a parameter "port" for specifying an IP port number for the connection group 202 to be created/opened. xtcp_open_group 404a returns a negative error status in case of an error, or a positive group identifier for the newly created group 202 in the case of success, respectively. xtcp_close_group 404b includes a parameter "gd" for specifying a group identifier for the connection group 202 to be closed.

API 400 further includes a number of function calls, xtcp_accept, xtcp_pars and xtcp_close 406a-408c for requesting XTCP service 106 to accept, return the parameters, and close a TCP connection 204, respectively. xtcp_accept 406a includes the parameter "gd" for specifying a group identifier for a connection group 202 for which a connection 204 is to be accepted as a group member; xtcp_accept 406a returns a negative error status in case of an error, or a positive connection identifier for the newly accepted connection 204 in the case of 'success, respectively. In addition to the same parameter "gd", each of xtcp_pars 406b and xtcp_close 406c also includes the parameter "cd" for specifying a connection identifier for a connection 204 whose parameters are to be retrieved or which is to be closed. xtcp_pars 406b also includes the parameter "sa" for specifying a data structure within which the returned connection parameters are to be stored; in one embodiment, the type of this data structure corresponds to the sockaddr_in type defined in the Berkeley Sockets API, as known to those skilled in the art.

Continuing to refer to FIG. 4, API 400 further includes a number of function calls, xtcp_recv and xtcp_send 408a and 408b for requesting XTCP service 106 to read a request packet received on a connection 204 and to send a reply packet to a connection 204 respectively. Both xtcp_recv 408a and xtcp_send 408b include the earlier described parameter "gd" for specifying a group identifier for a connection group 202.

xtcp_recv 408a further includes the following parameters: "cd", a pointer to a location in which the connection identifier for the received connection 204 is to be stored upon a successful return; "buf", a pointer to a memory buffer that will be used to deposit the received data; and "len", the size of the memory buffer "buf". xtcp_recv 408a returns the number of received bytes upon success, or a negative error status on failure, respectively. The behavior of xtcp_recv 408a is non-blocking: if none of the connections 204 in the connection group 202 has data available, xtcp_recv immediately returns with an appropriate error status.

xtcp_send 408b further includes the following parameters: "cd", a connection identifier for the connection 204 on which the data is to be sent; "ackd", the number of bytes received on this connection during the last call to xtcp_recv 408a that have been processed by application server 108 and should be acknowledged to the TCP service 116 of the application client 118 by the XTCP service 106; "buf", a pointer to a memory buffer that contains the data to be sent; and "len", the size of the memory buffer "buf". xtcp_send 410a returns the number of sent bytes upon success, or a negative error status on failure. The behavior of xtcp_send 410a is non-blocking: if the data can not be sent, xtcp_send immediately returns with an appropriate error status. Irrespective of the success or failure of sending the data, xtcp_send 410a acknowledges the amount of data specified by the "ackd" parameter to the TCP service 116 of the application client 118. Unlike the TCP implementations known to those skilled in the art (such as the Berkeley TCP/IP stack), the XTCP service 106 will not acknowledge received packets until directed to do so by the application server 108 via a call to xtcp_send 410a. If the application server 108 wishes to acknowledge data received from an application client 118 without sending back any data to said application client, it may do so by calling xtcp_send 410a with a "len" argument of zero. For a given connection 204, the amount of received data acknowledged by the application server 108 through a call to xtcp_send 410a may never exceed the actual size of the data received on that connection through the previous call to xtcp_recv 408a; however, if less data than was actually received is acknowledged, the portion of the data that has not been acknowledged (whose size is equal to the difference between the size of the received data, and the size of the acknowledged data) will be returned by the XTCP service 106 (possibly together with other new data received from the application client 118) on the next call to xtcp_recv 408a.

Finally, in the preferred embodiment of the present invention, API 400 further includes a number of function calls, XTCP_ZERO 410b, XTCP_CLR 410c, XTCP_SET 410d, and XTCP_ISSET 410e etc. for manipulating sets of connection groups 202. To those skilled in the art, these function calls are similar to the ones used to manipulate sets of file or socket descriptors in the UNIX operating system. Function call xtcp_select 410f is used by application server 108 to block until one or more connection groups of a specified read connection group set or a specified accept connection group set become "ready", or until a timeout occurs, whichever is sooner. A connection group 202 in a read connection group set is considered "ready" if at least one of its connections 204 has data available that can be retrieved with a call to xtcp_recv 408a. A connection group 202 in an accept connection group set is considered "ready" if any new connections destined to the IP port to which this connection group 202 has been bound through a previous call to xtcp_open_group 404a can be immediately accepted with a call to xtcp_accept 406a. xtcp_select 410f includes the following parameters: "n", the number of elements contained in the following two connection set parameters; "readgds", a pointer to the read connection group set; "acceptgds", a pointer to the accept connection group set; and "timeout", a pointer to a timeout value. xtcp_select 410f returns the positive number of "ready" connection group sets on success, or a negative error status on error, or zero if the a number of time units greater than or equal to the one specified in the "timeout" argument has elapsed without any of the specified connection groups becoming "ready" in the sense defined above, respectively.

In alternate embodiments, more or less parameters and/or more or less function calls may be practiced instead.

Communication Flows

FIGS. 5a-5d illustrate various example communication flows in accordance with XTCP of the present invention. More specifically, the figures illustrate the states and flow of messages on both sides of a connection between a client 112 running an application client 118 using conventional TCP and IP services 112 and 114, respectively, and server 102, running an application server 108 using XTCP service 106 of the present invention and conventional IP service 104. The $1^{st}$ and $7^{th}$ columns (labeled "Application Client" and Application Server", respectively) of each of FIG. 5a-5d show the state of application client and application server 118 and 108, respectively. The $2^{nd}$ and $6^{th}$ columns (labeled "API of TCP service" and "API of XTCP Service", respectively) of each of FIG. 5a-5d show the flow of data between the application client 118 and the TCP service 116, and between the application server 108 and the XTCP service 106, respectively; this flow of data occurs over the API of each given service. The $3^{rd}$ and $5^{th}$ columns (labeled "TCP Service" and "XTCP Service", respectively) of each of FIG. 5a-5d show the state of the communication services as a pair [X:Y], where X and Y are the current confirmed (i.e., acknowledged) sequence numbers for outbound and inbound transmissions respectively; on the second line of each of these illustrations, the quantity of sent outbound data that has not been acknowledged yet (and is thus cached by TCP service 116 or XTCP service 106, respectively) is shown. The $4^{th}$ column (labeled "Packets sent over Network Fabric") of each of FIG. 5a-5d depicts the transmission (or non-transmission) of packets across the network fabric 120, e.g. the Internet, where Req[N,k] and Ans[N,k] denote a request or reply message, respectively, of length k starting at sequence number N, and ACK[N] denotes a TCP acknowledgment up to sequence number N; as those skilled in the art will appreciate, TCP acknowledgements can be sent as separate messages or can be piggybacked on top of request or reply messages. The illustrations assume that a connection has been already established (including acceptance on the server side and assignment to a connection group), and that the current sequence numbers on the client TCP service 116 and the server XTCP service 106 are C and S, respectively.

Figure 5A:
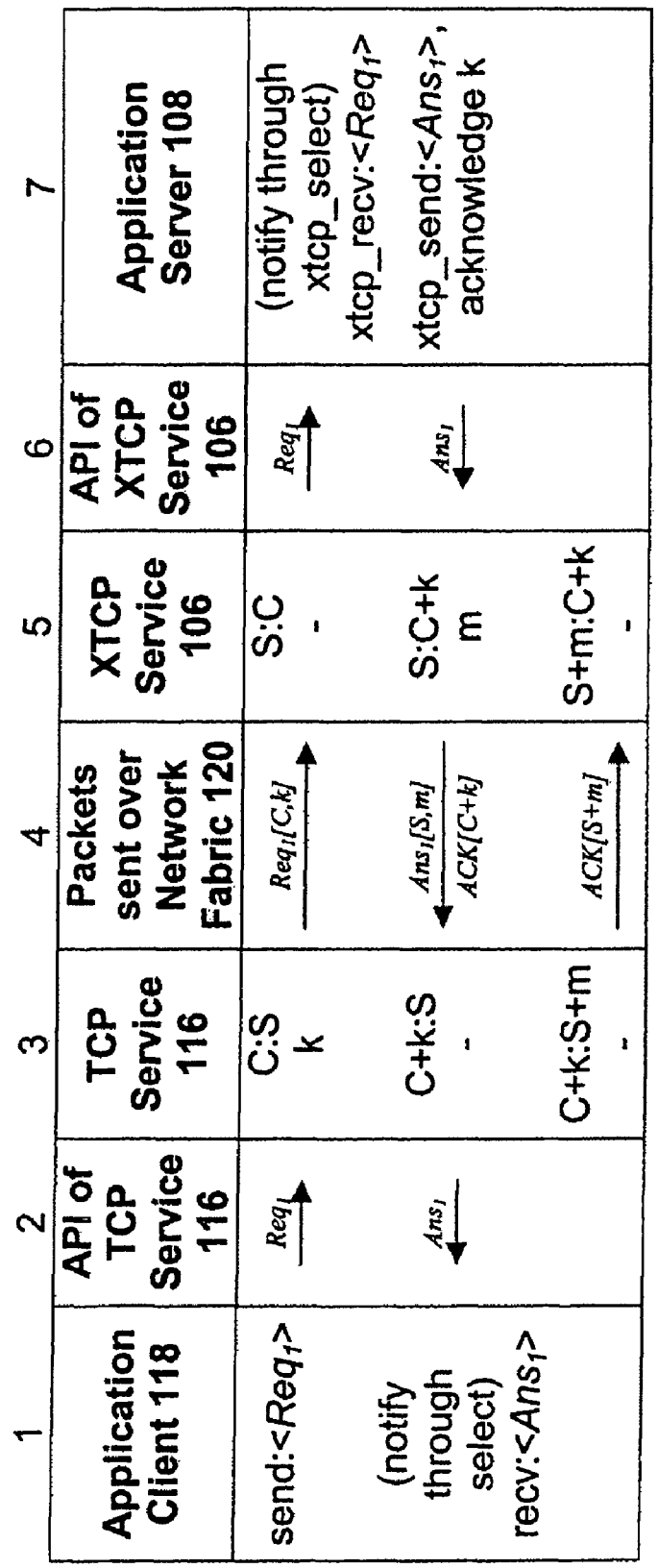
FIGS. 5a-5d illustrate various communication flows in accordance with XTCP of the present invention, under one embodiment.

FIG. 5a shows an ongoing exchange between application client 118 and application server 108, using TCP and IP communication services 116 and 114, and 106 and 104, respectively. As illustrated, the communication between application client 118 and application server 108 proceeds through a number of messages. In one embodiment, the maximum size of a message is bounded, and is below the MTU (Maximum Transmission Unit) for the connection between client computing device 112 and computing server 102. Thus, for the embodiment, most client messages arrive at computing server 102 without fragmentation. On computing server 102 endowed with the teachings of the present invention, the TCP acknowledgment of received packets is delayed by the XTCP service 106 until such packets (or a part thereof) are explicitly acknowledged by application server 108 using the XTCP API 400 previously described. TCP acknowledgements are typically sent by the XTCP service 106 along with the reply data, thereby saving one packet transmission from computing server 102 to computing devices 112. With large numbers of concurrently open connections (potentially over one million), the reduction of one packet for each flow adds up to significant network traffic savings.

Furthermore, for applications such as instant messaging applications, where the answer packets are generated and sent by application server 108 quickly, the expected delay for having the acknowledgement of received packets be controlled by the application server 108 will be short and inconsequential. As those skilled in the art would appreciate, the interaction between client computing device 112 and computing server 102 remains strictly TCP/IP compliant. Together with the inconsequential delay in the receipt of acknowledgements to the request packets by client computing devices 112, the improvement to server 102 is substantially transparent to client computing devices 112. Those skilled in the art will appreciate that even if the application server 108 should occasionally delay the acknowledgement of received packets, the interaction between the computing server 102 and the client computing devices 112 will remain TCP/IP compliant; in the above case, the client's TCP layer 116 may decide to retransmit the packet(s) for which acknowledgement(s) have been delayed, and further interactions will be in accordance with the rules set forth for packet retransmission by the TCP standard.

Figure 5B:
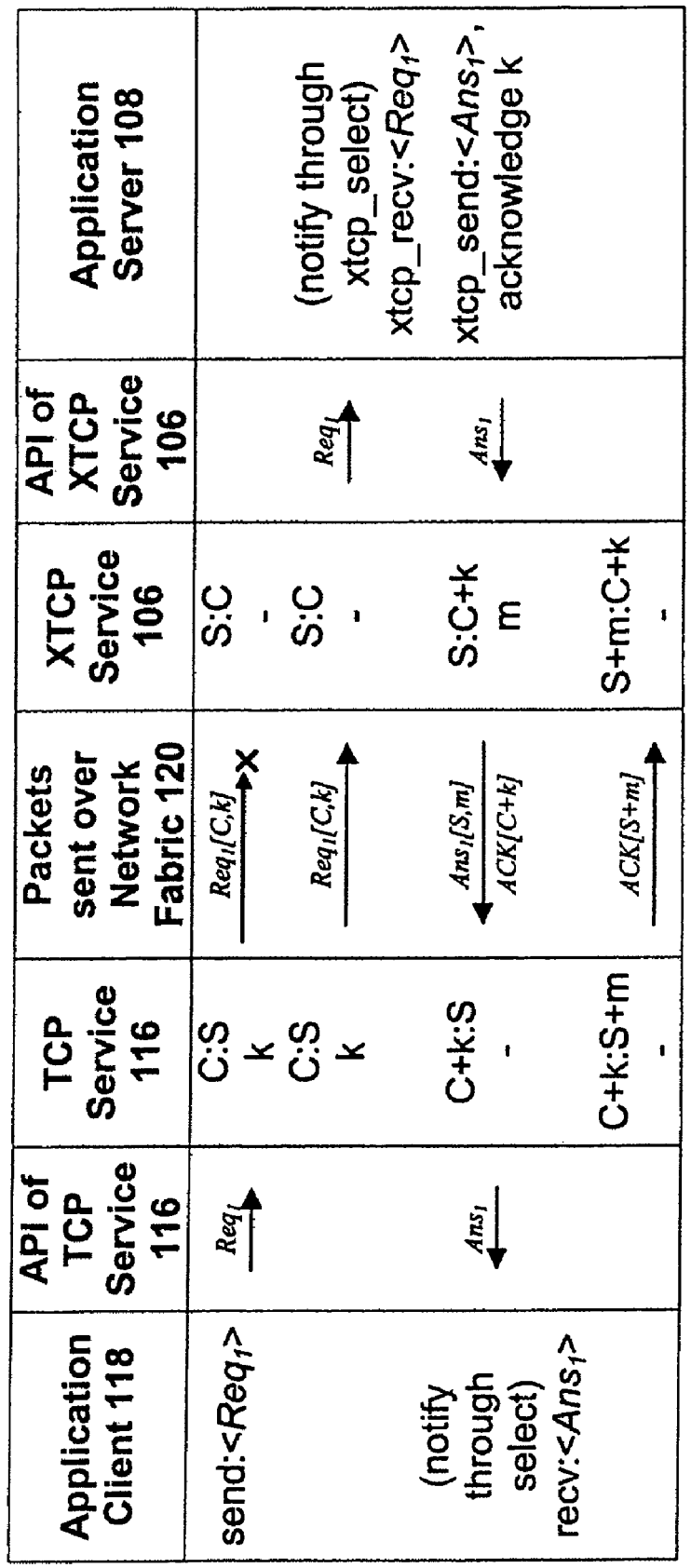

FIG. 5b illustrates an ongoing exchange in which a request packet sent by application client 118 using TCP service 116 and IP service 114 is lost. As illustrated (and as known to those skilled in the art), the condition results in the eventual resend of the request packet by client side TCP service 116; the retransmitted request is then serviced by server 102 in due course.

Figure 5C:
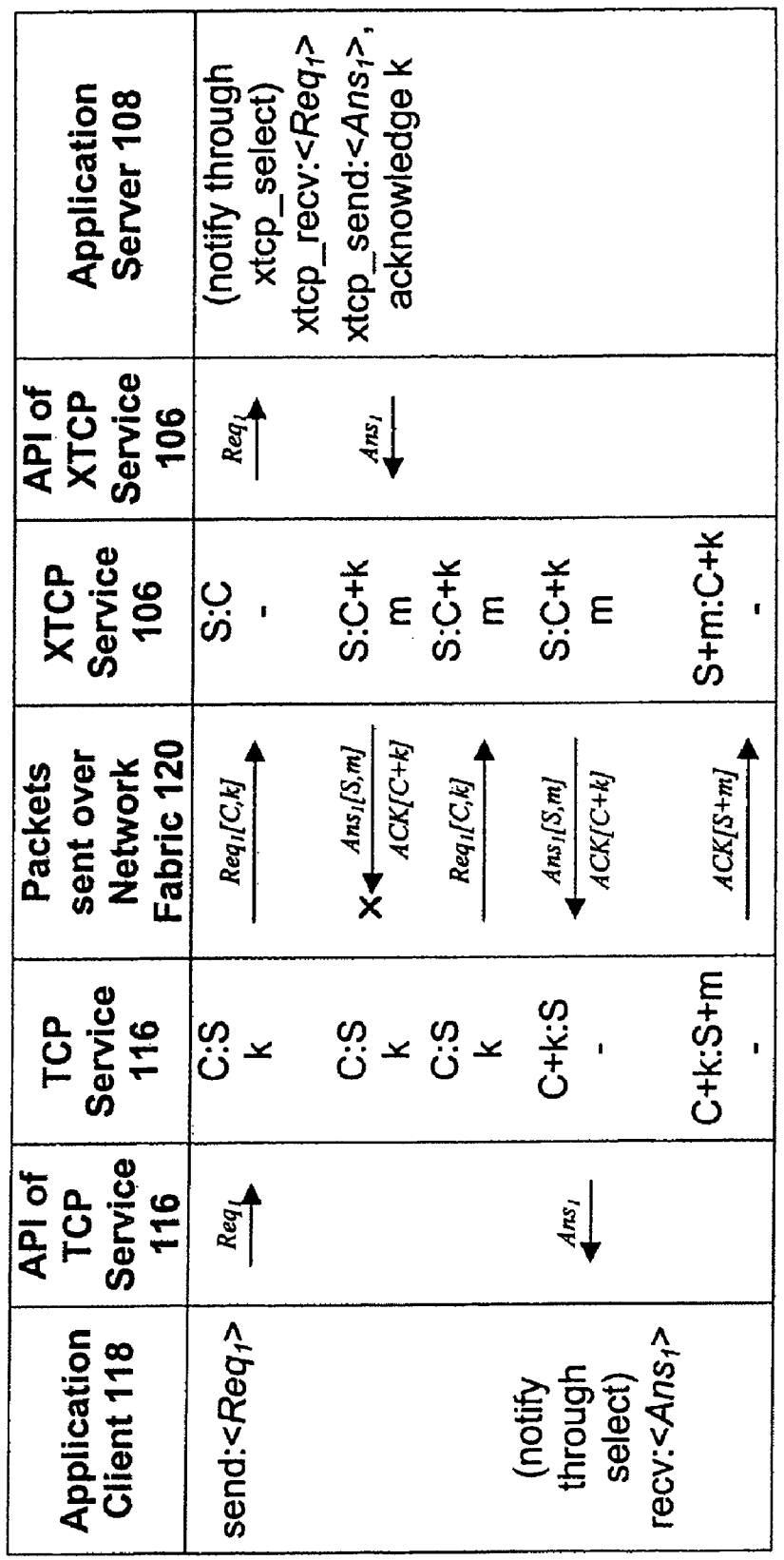

FIG. 5c shows a similar exchange, in which an answer packet from server 102 for client 114 is lost. As illustrated, the condition results in the resend of the answer packet by XTCP service 106, upon receipt of a duplicate of the original request from client 112 at a later point in time.

Figure 5D:
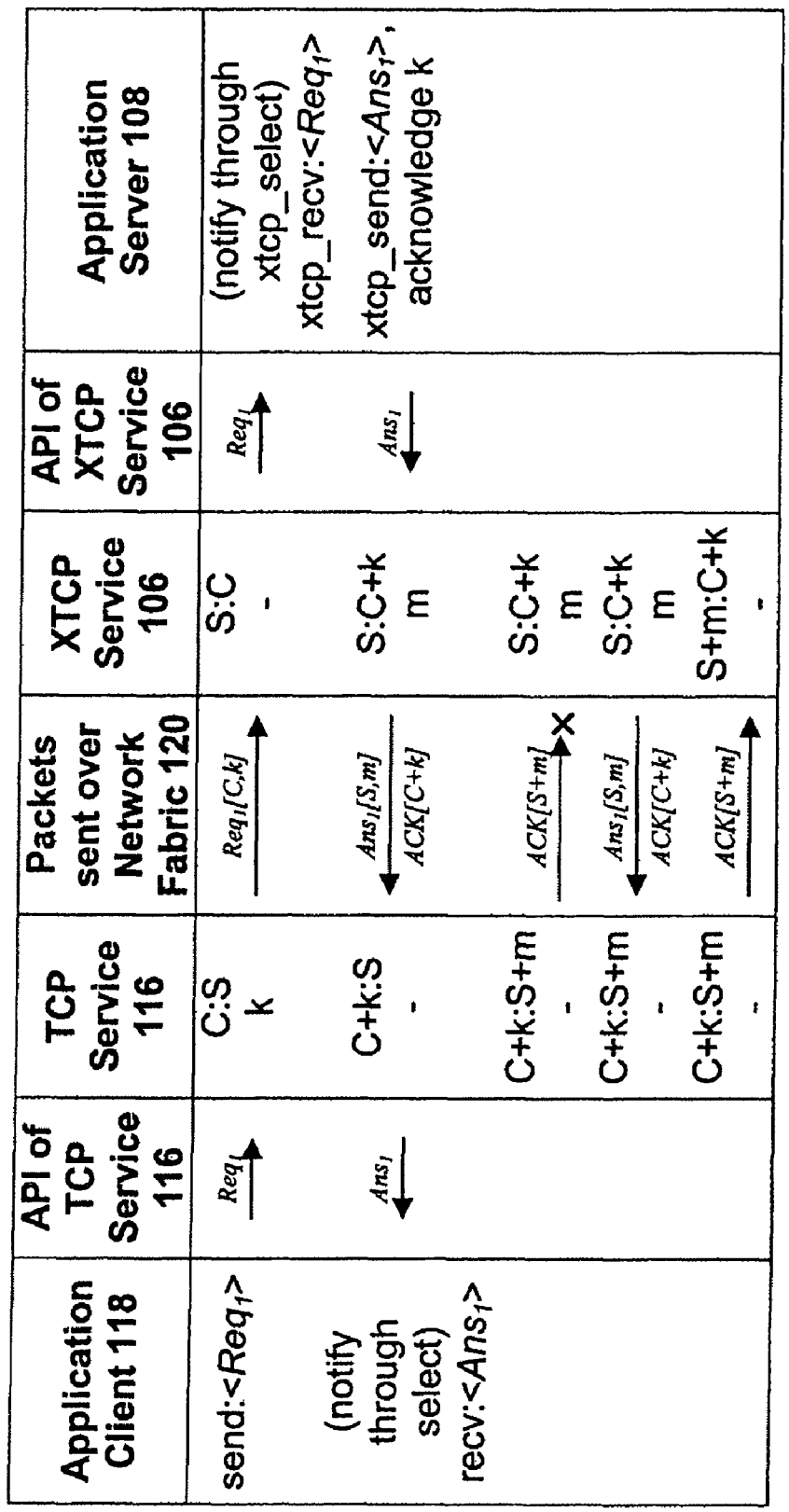

FIG. 5d illustrates yet another similar exchange, where the acknowledgment by client 112 to the answer packet sent by server 102 is lost. The condition results in XTCP service 106 registering a timeout and resending the answer packet. The resend is re-attempted periodically, until XTCP service 106 receives the acknowledgment for the answer packet from client 112, or the connection is deemed to be in a "time out" status (i.e. lost).

Operation Flows

Figure 6B:
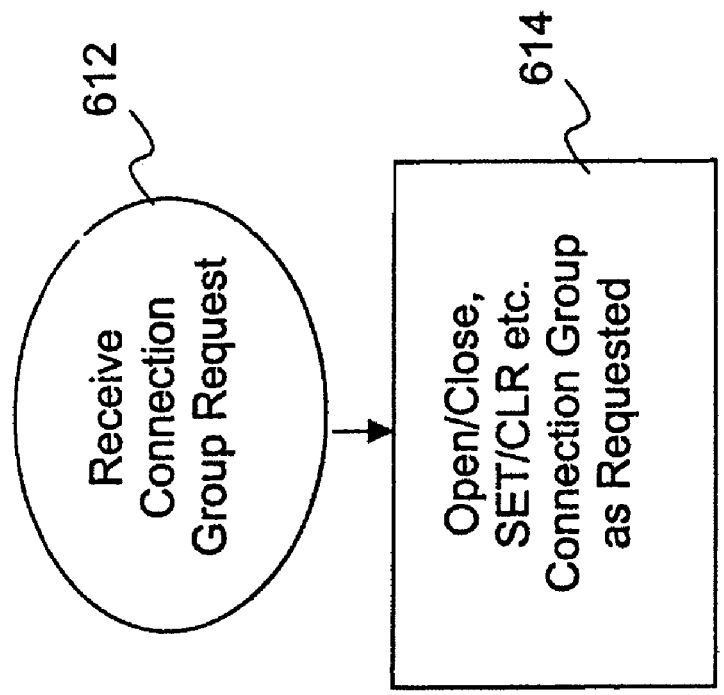
Figure 6A:
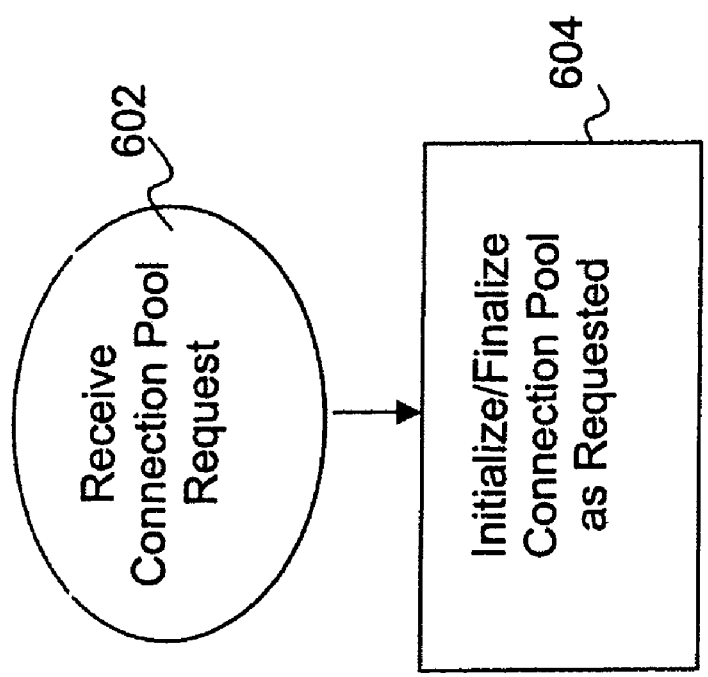

FIGS. 6a-6i illustrate the operational flows of the relevant aspects of XTCP service 106 of FIG. 1, in accordance with one embodiment. As illustrated in FIG. 6a, upon receipt of a connection pool request via a call to xtcp_initialize 402a or xtcp_finalize 402b block 602, XTCP service 106 creates and initializes or tears down, respectively, a connection pool as requested, block 604. In particular, in the earlier described preferred embodiment, when creating a connection pool, XTCP service 106 creates and initializes a shared buffer to buffer receive packets for connections of connection groups of the connection pool being created.

As illustrated in FIG. 6b, upon receipt of a connection group request via a call to xtcp_open_group 404a or xtcp_close_group 404b, block 612, XTCP service 106 opens or closes, respectively, a connection group as requested, block 614. In particular, in the earlier described preferred embodiment, when creating a connection group, XTCP service 106 creates and initializes a shared file descriptor for the connection group to be shared by subsequently created connections of the connection group, and to be used by subsequent calls to xtcp_accept 406a, xtcp_pars 406b, xtcp_close 406c, xtcp_recv 408a, xtcp_send 408b, and xtcp_select 410f.

As illustrated in FIG. 6c, upon receipt of a connection request from one of the application clients 118, block 622, XTCP service 106 notifies the appropriate application server 108 of the request, block 624. This notification occurs via a successful return from the xtcp_select call 410f that signals to the application server 108 that one of the connection groups in the accept group set has a pending connection request on it. If the connection request is timely accepted by the notified application server 108 via a call to xtcp_accept 406a, XTCP service 106 accepts the connection request by completing the TCP connection setup negotiation (according to the TCP protocol that is well-known to those skilled in the art), and "attaches" the accepted connection to a connection group, as specified by the application server 108, block 628. If the connection request was not timely accepted by the notified application server, XTCP service 106 rejects the connection request (according to the TCP practice well-known to those skilled in the art), block 630.

As illustrated in FIG. 6d, upon receipt of a request for connection parameters via a call to xtcp_pars 406b, block 632, XTCP service 106 returns to application server 108 the connection parameters (including the IP address and port of the connection requested by the application client 118 running on client computing device 112) for the specified connection, block 634. In the earlier described embodiment, XTCP service 106 stores the returned data in the specified data structure corresponding to a Berkeley Sockets API sockaddr_in structure (which is well-known to those skilled in the art).

Figure 6E:
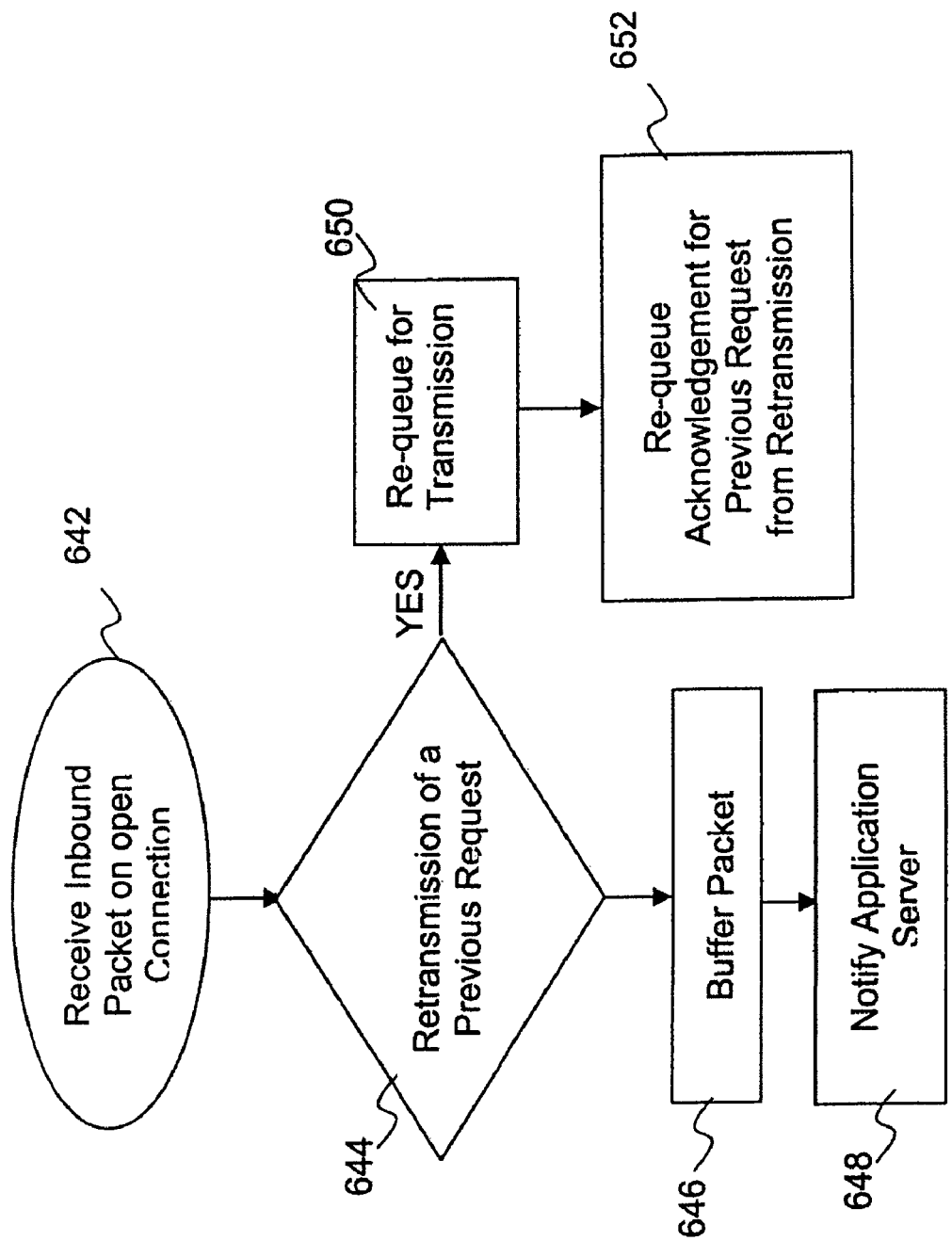

As illustrated in FIG. 6e, upon receipt of an inbound (receive) request packet on an open connection, block 642, XTCP service 106 determines whether the request packet is a re-transmission of a previously received request packet, block 644. If the request packet is not a re-transmission, XTCP service 106 buffers the received request packet in the shared buffer pool 302 of the connection, block 646, and notifies the appropriate application server 108 to read the received request packet, block 648, by including the corresponding group descriptor for the connection in the "ready" read set returned by a call to xtcp_select 410f. However, if the request packet is a re-transmission, XTCP service 106 re-queues the cached reply packet that was sent by the application server 108 via a call to xtcp_send 408b for re-transmission, block 650. Additionally, XTCP service 106 further re-queues the acknowledgement for the request packet for re-transmission, block 652. In the presently preferred embodiment, XTCP service 106 systematically transmits queued packets as in prior art conventional TCP services.

As illustrated in FIG. 6f, upon receipt of a request from application server 108 to read a received packet via a call to xtcp_recv 408a, block 656, XTCP service 106 returns the requested receive packet (previously buffered in block 646) to the application server 108, block 658.

As illustrated in FIG. 6g, upon receipt of a request to send an answer packet via a call to xtcp_send 408b, block 662, XTCP service 106 queues the answer packet for transmission (also referred to as a transmit packet), block 664. As described earlier, XTCP service 106 further queues an acknowledgment for the corresponding request packet that prompted the generation and request transmission of the answer packet, block 666. The amount of data (i.e. number of bytes) acknowledged in the acknowledgement corresponds to the amount of data processed and acknowledged by application server 108, as indicated in the "ackd" argument to the call to xtcp_send 408b that was used to send the answer. As those skilled in the art will understand, acknowledgements are typically piggybacked on the same packets as the transmit packets, by using the dedicated TCP acknowledgement fields in the TCP header of the packet. Further, XTCP service 106 caches the answer (transmit) packet queued in the shared transmit packet buffer for subsequent re-transmission if needed, block 668. For the embodiment, XTCP service 106 further sets a "resend" timer, block 670.

As illustrated in FIG. 6h, upon expiration of the "resend" timer for an answer (transmit) packet, block 672, XTCP service 106 determines whether a "timeout" for the connection has occurred, block 674. If "timeout" for the connection has not occurred, XTCP service 106 re-queues the cached answer (transmit) packet for re-transmission, block 676. If "timeout" for the connection has occurred, XTCP service 106 purges the cached answer (transmit) packet from the shared transmit packet buffer, block 676, and marks this connection as "down".

Similarly, as illustrated in FIG. 6i, upon receipt of an acknowledgement to an answer (transmit) packet, block 682, XTCP service 106 also purges the cached answer (transmit) packet from the shared transmit packet buffer, block 684, and deletes any pending "resend" timer for this transmission, block 686.

Example Computer System

Figure 7:
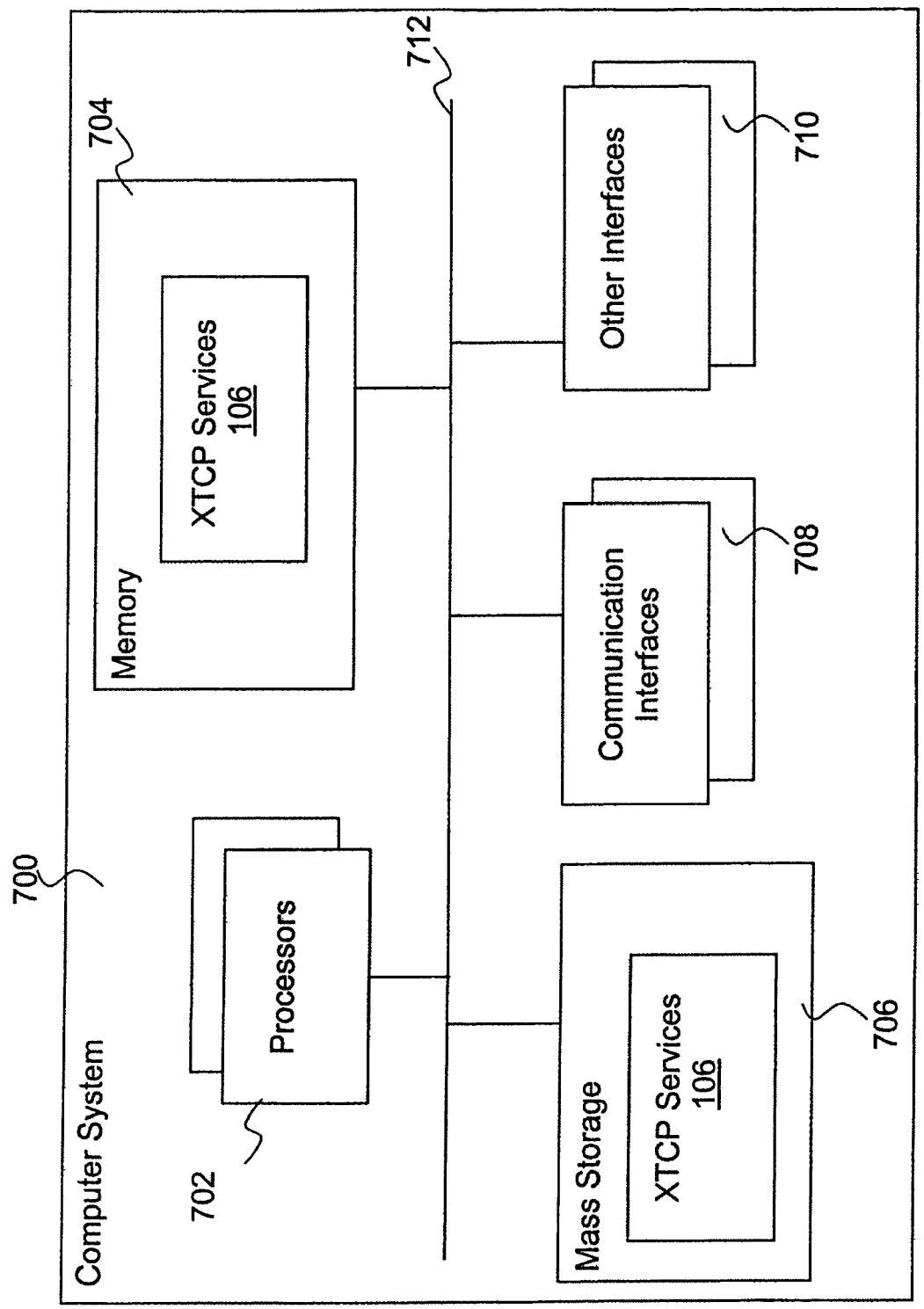
FIG. 7 illustrates an example computer system suitable for use to practice the present invention, in accordance with one embodiment.

FIG. 7 illustrates an exemplary computer system 700 suitable for use as either computing server 102 or a client computing device 112 of FIG. 1 to practice the present invention. As shown, computer system 700 includes one or more processors 702 and system memory 704. Additionally, computer system 700 includes one or more mass storage devices 706 (such as diskette, hard drive, CDROM and so forth), communication interfaces 708 (such as network interface cards, modems and so forth), and one or more input/output devices 710 (such as keyboard, cursor control and so forth). The elements are coupled to each other via system bus 712, which represents one or more buses. In the case of multiple buses, they are bridged by one or more bus bridges (not shown). Each of these elements performs its conventional functions known in the art. In particular, system memory 704 and mass storage 706 are employed to store a working copy and a permanent copy of the programming instructions implementing the teachings of the present invention (i.e. XTCP service 106). The permanent copy of the programming instructions may be loaded into mass storage 706 in the factory, or in the field, as described earlier, through a distribution medium (not shown) or through communication interface 708 (from a distribution server (not shown). The constitution of these elements 702-712 are known, and accordingly will not be further described.

Modifications and Alterations

While the present invention has been described referencing the illustrated and above enumerated embodiments, the present invention is not limited to these described embodiments. Numerous modification and alterations may be made, consistent with the scope of the present invention as set forth in the claims to follow.

For example, XTCP service 106 may also be provided with logic to monitor the usage of the various buffers, and "throttle" down incoming transmissions when the amount of free buffering space has been reduced below a predetermined threshold. Such "throttling" may be achieved, in various embodiments, e.g. by (1) withholding acknowledgment of some or all received packets, and/or (2) hiding some or all received packets from the application server 108 (thereby discarding all the data contained in these packets); however (3) the acknowledgment field of all incoming packets is always processed, to take advantage of any opportunity to reclaim buffer space in the transmit packet buffer by discarding acknowledged reply data.

Of course, the above examples are merely illustrative. Based on the above descriptions, many other equivalent variations will be appreciated by those skilled in the art.

Conclusion and Epilogue

Thus, a method and apparatus for improving the operating efficiency of a server that supports TCP based communications has been described. Since as illustrated earlier, the present invention may be practiced with modification and alteration within the spirit and scope of the appended claims, the description is to be regarded as illustrative, instead of being restrictive on the present invention.

What is claimed is:

1. In a computer server, a method of operation by a communication protocol service, comprising:

receiving at the computer server a first connection pool creation request from a first application server executing on the computer server to allocate and initialize a first connection pool for subsequent allocation and creation of a first plurality of grouped client connections in the first connection pool for the first application server to communicate with clients of the first application server, wherein the first connection pool creation request specifies a buffer pool size, and wherein the first plurality of grouped client connections belongs to a first connection group in the first connection pool, and wherein the first plurality of grouped client connections share a common port to the computer server, and wherein the clients are physically distinct from the computer server and configured to communicate with the computer server via a communication network; and in response to receiving the first connection pool creation request, allocating and initializing the first connection pool, including allocating and initializing a first shared receive packet buffer of the first connection pool with the buffer size specified in the received first connection pool creation request, the first shared receive packet buffer for buffering received packets of the first plurality of grouped client connections at the computer server in a shared manner, and wherein the first shared receive packet buffer is located in the computer server, wherein when a packet associated with an out of group client is received at the computer server, the packet is excluded from the first shared receive packet buffer, the out of group client communicating with the first application server through the packet, and the out of group client not being one of the first plurality of grouped client connections;

allocating and initializing a transmit packet buffer for buffering transmit packets of individual connections in the first connection pool and other transmit packets of other individual connections in at least one other connection pool; and throttling packet transmissions from the clients of the first application server when an amount of free buffering space of one or both of the receive packet buffer or the transmit packet buffer has been reduced below a predetermined threshold, wherein the throttling comprises withholding acknowledgment of at least one individual received packet and hiding, the at least one individual received packet from the first application server.

2. The method of claim 1, wherein said clients of the first application server communicate with the first application server in accordance with a TCP/IP communication protocol.

3. The method of claim 1, wherein the method further comprises receiving a first connection group creation request from the first application server to allocate and initialize the first connection group in said first connection pool for subsequent allocation and creation of a first subset of said first plurality of grouped client connections for the first application server to communicate with a first subset of said clients of the first application server; and in response to receiving the first connection group creation request, allocating and initializing the first connection group, including allocating and initializing a first common file descriptor of the first connection group describing connection attributes of the first subset of grouped client connections managed at a group level.

4. The method of claim 3, wherein the method further comprises:

in response to a first connection request from a first of said first subset of clients, processing a first connection creation or acceptance request from the first application server to allocate and initialize a first connection of the first connection group for the first application server to communicate with said first of said first subset of clients of the first application server; and in response to processing the first connection creation or acceptance request, allocating and initializing the first connection, including associating said first connection with said first connection group.

5. The method of claim 4, wherein the method further comprises:

in response to a second connection request from a second of said first subset of clients, processing a second connection creation or acceptance request from the first application server to allocate and initialize a second connection of the first connection group for the first application server to communicate with said second of said first subset of clients of the first application server; and in response to processing the second connection creation or acceptance request, allocating and initializing the second connection, including associating said second connection with said first connection group.

6. The method of claim 3, wherein the method further comprises:

receiving a second connection group creation request from the first application server to allocate and initialize a second connection group in said first connection pool for subsequent allocation and creation of a second subset of said first plurality of grouped client connections for the first application server to communicate with a second subset of said clients of the first application server; and in response to receiving the second connection group creation request, allocating and initializing the second connection group, including allocating and initializing a second common file descriptor of the second connection group describing connection attributes of the second subset of grouped client connections managed at a group level.

7. The method of claim 1, wherein the method further comprises:

receiving a second connection pool creation request from the first or a second application server to allocate and initialize a second connection pool for subsequent allocation and creation of a second plurality of grouped client connections for the first application server to communicate with clients of the first application server; and in response to receiving the second connection pool creation request, allocating and initializing the second connection pool, including allocating and initializing a second shared receive packet buffer of the second connection pool for buffering received packets of the second grouped client connections in a shared manner.

8. An apparatus comprising:

storage medium having stored therein programming instructions designed to enable said apparatus to:

receive at the apparatus a first connection pool creation request specifying a buffer pool size from a first application server executing on the apparatus to allocate and initialize a first connection pool for subsequent allocation and creation of a first plurality of grouped client connections in the first connection pool for the first application server to communicate with clients of the first application server, wherein the first plurality of grouped client connections share a common port on the apparatus, and wherein the clients are physically distinct from the apparatus and configured to communicate with the apparatus via a communication network;

in response to receiving the first connection pool creation request, allocate and initialize the first connection pool, including allocating and initializing a first shared receive packet buffer of the first connection pool with the buffer size specified in the received first connection pool creation request, the first shared receive packet buffer for buffering received packets of the first plurality of grouped client connections in the first connection pool at the apparatus in a shared manner, the first shared receive packet buffer being located in the apparatus, wherein when a packet associated with an out of group client is received at the apparatus, the packet is not added to the first shared receive packet buffer, the out of group client communicating with the first application server through the packet, and the out of group client not being one of the first plurality of grouped client connections;

allocate and initialize a transmit packet buffer for buffering transmit packets of individual connections in the first connection pool and for other transmit packets of other individual connections in another connection pool; and throttle packet transmissions from the clients of the first application server when an amount of free available buffering space has been reduced below a predetermined threshold, wherein to throttle packet transmissions comprises withholding acknowledgment of at least one individual received packet and hiding the at least one individual received packet from the first application server; and a processor coupled to the storage medium to execute the programming instructions.

9. The apparatus of claim 8, wherein said clients of the first application server communicate with the first application server in accordance with a TCP/IP communication protocol.

10. The apparatus of claim 8, wherein the programming instructions further enable the apparatus to:

receive a first connection group creation request from the first application server to allocate and initialize a first connection group in said first connection pool for subsequent allocation and creation of a first subset of said first plurality of grouped client connections for the first application server to communicate with a first subset of said clients of the first application server; and in response to receiving the first connection group creation request, allocate and initialize the first connection group, including allocating and initializing a first common file descriptor of the first connection group describing connection attributes of the first subset of grouped client connections managed at a group level.

11. The apparatus of claim 10, wherein the programming instructions further enable the apparatus to:

in response to a first connection request from a first of said first subset of clients, process a first connection creation or acceptance request from the first application server to allocate and initialize a first connection of a first connection group for the first application server to communicate with said first of said first subset of clients of the first application server; and in response to processing the first connection creation or acceptance request, allocate and initialize the first connection, including associating said first connection with said first connection group.

12. The apparatus of claim 11, wherein the programming instructions further enable the apparatus to:

in response to a second connection request from a second of said first subset of clients, process a second connection creation request from the first application server to allocate and initialize a second connection of a first connection group for the first application server to communicate with said second of said first subset of clients of the first application server; and in response to processing the second connection creation request, allocate and initialize the second connection, including associating said second connection with said first connection group.

13. The apparatus of claim 10, wherein the programming instructions further enable the apparatus to receive a second connection group creation request from the first application server to allocate and initialize a second connection group in said first connection pool for subsequent allocation and creation of a second subset of said first plurality of grouped client connections for the first application server to communicate with a second subset of said clients of the first application server; and in response to receiving the second connection group creation request, allocate and initialize the second connection group, including allocating and initializing a second common file descriptor of the second connection group describing connection attributes of the second subset of grouped client connections managed at a group level.

14. The apparatus of claim 8, wherein the programming instructions further enable the apparatus to:

receive a second connection pool creation request from the first or a second application server to allocate and initialize a second connection pool for subsequent allocation and creation of a second plurality of grouped client connections for the first application server to communicate with clients of the first application server; and in response to receiving the second connection pool creation request, allocate and initialize a second shared receive packet buffer of the second connection pool for buffering received packets of the second grouped client connections in a shared manner.

15. In a computer server, a method of operation by an application server, comprising:

requesting a communication protocol service to allocate and initialize a connection pool, wherein the requesting includes specifying a buffer size for a receive packet buffer of the connection pool;

requesting the communication protocol service to allocate and initialize a first connection group in the connection pool for subsequent allocation and creation of a first plurality of grouped client connections in the connection pool for communication with a first plurality of clients, wherein received packets of the first plurality of grouped client connections are bufferable in the receive packet buffer, and wherein the first plurality of grouped client connections share a common port on the computer server, and wherein the first plurality of clients are physically distinct from the computer server and configured to communicate with the computer server via a communication network;

requesting the communication protocol service to allocate and initialize a second connection group in the connection pool for subsequent allocation and creation of a second plurality of grouped client connections in the connection pool for communication with a second plurality of clients, wherein received packets of the second plurality of grouped client connections are bufferable in the receive packet buffer;

subsequently, in response to a connection request from a first of said first clients, requesting the communication protocol service to allocate a first connection of the first connection group in the connection pool for communication with a first of said first plurality of clients, wherein each of the first plurality of clients concurrently connects with the computer server through a first socket descriptor located on the computer server, wherein only connections to the computer server made by one or more of the first plurality of clients connect with the computer server through the first socket descriptor, and wherein an out of group client connects with the computer server through a second socket descriptor, the first plurality of clients not including the out of group client;

allocating and initializing a transmit packet buffer for buffering transmit packets for individual connections in the first connection pool and for other transmit packets of other individual connections in at least one other connection pool; monitoring usage of one or both of the receive packet buffer or the transmit packet buffer; and based on the monitoring, throttling packet transmissions from individual clients of one or both of the first plurality of clients or the second plurality of clients when an amount of free buffering space has been reduced below a predetermined threshold, wherein the throttling comprises withholding acknowledgment of at least one individual received packet and hiding the at least one individual received packet from the application server.

16. The method of claim 15, wherein said first plurality of clients communicate with the application server in accordance with a TCP/IP communication protocol.

17. The method of claim 15, wherein the method further comprises subsequently, requesting the communication protocol service to allocate a second connection of the first connection group in the connection pool for communication with a second of said first plurality of clients.

* * * * *

UNITED STATES PATENT AND TRADEMARK OFFICE
CERTIFICATE OF CORRECTION

| | | |
|---|---|---|
| PATENT NO. | : 8,018,929 B2 | Page 1 of 1 |
| APPLICATION NO. | : 11/137896 | |
| DATED | : September 13, 2011 | |
| INVENTOR(S) | : Roger L. Soles et al. | |

It is certified that error appears in the above-identified patent and that said Letters Patent is hereby corrected as shown below:

In column 13, line 32, in Claim 1, delete "hiding, the" and insert -- hiding the --, therefor.

Signed and Sealed this
Twenty-ninth Day of November, 2011

David J. Kappos
*Director of the United States Patent and Trademark Office*